United States Patent
Braun et al.

(10) Patent No.: US 9,680,403 B2
(45) Date of Patent: Jun. 13, 2017

(54) CONTROL DEVICE AND METHOD FOR CONTROLLING AN INDUCTION MACHINE

(71) Applicant: Robert Bosch GmbH, Stuttgart (DE)

(72) Inventors: Martin Braun, Neustetten-Wolfenhausen (DE); Thomas Gaberan, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 14/193,506

(22) Filed: Feb. 28, 2014

(65) Prior Publication Data

US 2014/0265958 A1    Sep. 18, 2014

(30) Foreign Application Priority Data

Mar. 13, 2013   (DE) .................. 10 2013 204 382

(51) Int. Cl.
  *H02P 6/18*   (2016.01)
  *H02P 6/00*   (2016.01)
  *H02P 6/28*   (2016.01)

(52) U.S. Cl.
  CPC ............... *H02P 6/002* (2013.01); *H02P 6/18* (2013.01); *H02P 6/28* (2016.02)

(58) Field of Classification Search
  CPC ....................................................... H02P 6/18
  See application file for complete search history.

(56) References Cited

U.S. PATENT DOCUMENTS

| | | | | |
|---|---|---|---|---|
| 5,254,914 A * | 10/1993 | Dunfield | ............... | H02P 6/22 318/400.09 |
| 2007/0252587 A1* | 11/2007 | Stauder | ............... | G01D 5/2006 324/207.15 |
| 2008/0030162 A1* | 2/2008 | Salomaki | ............ | H02P 21/0039 318/721 |
| 2008/0174257 A1* | 7/2008 | Schnetzka | ............. | F25B 49/025 318/434 |
| 2010/0109584 A1* | 5/2010 | Kwon | ................. | H02P 21/0089 318/400.02 |

(Continued)

FOREIGN PATENT DOCUMENTS

| DE | 102 26 974 A1 | 1/2004 |
|---|---|---|
| DE | 10 2009 029 896 A1 | 12/2010 |
| WO | 92/01331 A1 | 1/1992 |

OTHER PUBLICATIONS

Setty et al.; Comparison of High Frequency Signal Injection Techniques for Rotor Position Estimation at Low Speed to Standstill of PMSM; IEEE 5th India International Conference on Power Electronics (IICPE); Dec. 6-8, 2012; 6 Pages.

*Primary Examiner* — Shawki S Ismail
*Assistant Examiner* — Muhammad Islam
(74) *Attorney, Agent, or Firm* — Maginot, Moore & Beck LLP

(57) ABSTRACT

A control device for an induction machine includes an angle determining device designed to determine a rotor angle of the induction machine without requiring use of sensors. The angle determining device generates measuring voltage pulses which can be selectively used to replace control voltage pulses used to control the induction machine. Machine currents generated by the measuring voltage pulses can be used to determine a rotor angle without interrupting the control voltage pulses and/or operation of the induction machine.

10 Claims, 3 Drawing Sheets

(56) References Cited

U.S. PATENT DOCUMENTS

| | | | |
|---|---|---|---|
| 2010/0237817 A1* | 9/2010 | Liu | H02P 21/0007 |
| | | | 318/400.34 |
| 2011/0050157 A1* | 3/2011 | Ranganathan | H02K 17/28 |
| | | | 318/818 |
| 2012/0086375 A1* | 4/2012 | Hirono | H02P 6/18 |
| | | | 318/400.34 |

* cited by examiner

CONTROL DEVICE AND METHOD FOR CONTROLLING AN INDUCTION MACHINE

This application claims priority under 35 U.S.C. §119 to patent application no. DE 10 2013 204 382.1, filed on Mar. 13, 2013 in Germany, the disclosure of which is incorporated herein by reference in its entirety.

BACKGROUND

The disclosure relates to a control device and a method for controlling an induction machine, in particular a rotating or linear induction machine of an electrical drive system of an electrically operated vehicle.

When controlling an induction machine, by way of example in an electrical drive system of an electrically operated vehicle, it is crucial to know the position of the rotor relative to the stator of the induction machine. In order to provide a required torque using an induction machine, a rotating electrical field that rotates in a synchronized manner with the rotor is generated in the stator of the machine. The prevailing angle of the rotor is required for the control process for the purpose of generating this field.

One possibility for the purpose of determining the rotor position is to use mechanical, optical or magnetic sensors. However, these are expensive and require corresponding installation space in the electrical drive system. An alternative possibility for the purpose of determining the rotor angle is to measure voltages in the phase lines of the induction machine during different phase current configuration in the induction machine in order to draw conclusions regarding the prevailing rotor angle on the basis of the system response of the induction machine. It is not necessary to use external sensors for this purpose.

By way of example, the publication DE 10 2009 029 896 A1 discloses a method for determining the armature position of an induction machine and said method evaluates the electrical response of the induction machine to two voltage pulses that are time offset with respect to one another and are located perpendicular to one another.

The publication WO 92/01331 A1 discloses a switching arrangement for detecting the angle of rotation of an electrical machine without the use of sensors, in which arrangement of the voltage pulses that are generated by means of an inverter that is supplying the electrical machine are used as electrical measuring signals for the purpose of detecting the angle of rotation.

The publication DE 102 26 974 A1 discloses a method for determining the angle position of a rotor of an electrical machine without the use of sensors and said method uses for the purpose of pulse width modulation synchronous field-oriented test space diagrams for the purpose of generating a ripple content that is dependent upon test signals and said ripple content can in turn be evaluated for the purpose of determining the position angle.

In the case of conventional methods, it is necessary in each case to temporarily interrupt the operation of the modulation unit that generates the modulated control signals for the actual operation of the induction machine in order to be able to supply voltage pulses to the phase lines for the purpose of measuring the system response of the induction machine. As a consequence, undesired voltage and/or current fluctuations or ripples can occur at the input connectors of the induction machine.

There is therefore a demand for solutions for determining the rotor angle without the use of sensors, in which the voltage and/or current fluctuations can be minimized and the current and voltage sensor technology can be simplified.

SUMMARY

In accordance with one aspect of the disclosure, the present disclosure provides a control device for an induction machine, comprising:

an angle determining device that is designed so as to generate measuring voltage pulses, a modulation device that is designed so as to generate voltage switching patterns having control voltage pulses for the purpose of controlling an inverter that converts a direct current voltage into an alternating current voltage in dependence upon the control voltage pulses for the purpose of controlling the induction machine, and a measuring device that can be coupled to input connectors of the induction machine and is designed so as to measure at the input connectors of the induction machine the machine currents that are generated by means of the measuring voltage pulses and to pass the measured machine currents to the angle determining device for the purpose of ascertaining the rotor angle of the induction machine.

The angle determining device is further designed so as to pass the generated measuring voltage pulses of the angle determining device to the modulation device. The modulation device is further designed so as to output the measuring voltage pulses to the inverter and to synchronize the output of the measuring voltage pulses with the output of the control voltage pulses.

In accordance with a further aspect of the disclosure, an electrical drive system comprises an induction machine, an inverter that converts a direct current voltage into an alternating current voltage for the purpose of controlling the induction machine, and further comprises a control device in accordance with the disclosure.

In accordance with a further aspect of the disclosure, the present disclosure provides a method for controlling an induction machine comprising:

generating measuring voltage pulses for the induction machine by means of an angle determining device, generating, by means of a modulation device, voltage switching patterns having control voltage pulses for the purpose of controlling an inverter that converts a direct current voltage into an alternating current voltage in dependence upon the control voltage pulses for the purpose of controlling the induction machine, passing the generated measuring voltage pulses of the angle determining device to the modulation device, synchronizing the output of the measuring voltage pulses to the inverter with the output of the control voltage pulses by means of the modulation device, outputting the measuring voltage pulses to the inverter by means of the modulation device, measuring the machine currents that are generated by means of the measuring voltage pulses at the input connectors of the induction machine, and passing the measured machine currents to the angle determining device for the purpose of determining the rotor angle of the induction machine by means of the angle determining device.

One idea of the present disclosure is to integrate a method for determining the position of a rotor of an induction machine without the use of sensors into the modulation unit for the purpose of controlling the drive system. The voltage pulses that are necessary for the purpose of determining the position of the rotor are synchronized with the control voltage pulses for the purpose of controlling the induction machine by means of an inverter, in other words the measuring voltage pulses are integrated directly into the typical operating sequence of the modulation unit. The relevant system variables, such as stator currents, stator voltages and similar system parameters of the induction machine that are produced as a response to the measuring voltage pulses are measured in the same time period as the modulation of the control voltage pulses.

One considerable advantage of this approach is that several components that are otherwise necessary can be omitted. A separate signal processor for the purpose of outputting the measuring signal pulses to the inverter is by way of example also not necessary. Separate measuring signal detection components can also be omitted.

Furthermore, it is particularly advantageous that it is not necessary to additionally modify the process of detecting the operating parameters of the induction machine. As a consequence, undesired current or voltage fluctuations or rather ripples do not occur at the input connectors of the induction machine.

Furthermore, there is the advantage that either it is not necessary to adjust the typical control operation of the modulation unit to suit the process of determining the position of the rotor or alternatively it is only necessary to adjust said control operation insignificantly to suit said process. This renders possible the use of conventional signal processors or rather conventional modulation units for the purpose of controlling the inverter. The process of evaluating the measuring voltage pulses by means of the angle determining device can be adjusted in a variable manner to suit the requirements of the modulation unit; in particular the point in time of detecting the measuring signal can be subordinate to the input of the modulation unit.

In accordance with one embodiment of the control device in accordance with the disclosure, the modulation device can comprise a selection device that is designed so as to compare the received measuring voltage pulses of the angle determining device with the control voltage pulses of the modulation device and in dependence upon said comparison, replace at least one of the measuring voltage pulses with one of the control voltage pulses. This renders it possible for control voltage pulses, which are in any case to be produced, to be used simultaneously as measuring voltage pulses, as a result of which it is possible to further reduce the interruption of the normal operation of the modulation device.

In accordance with a further embodiment of the control device in accordance with the invention, the modulation device can be designed so as to output a synchronization signal for the purpose synchronizing the operation of the measuring device with the control voltage pulses to the measuring device. The modulation device can therefore prioritize the typical control operation over the measuring operation for the purpose of determining the position of the rotor, which results in fewer interruptions of the control operation and therefore improve the running smoothness of the induction machine.

In accordance with a further embodiment of the control device in accordance with the disclosure, the modulation device can be designed so as to generate the control voltage pulses for the purpose of controlling an inverter in accordance with a pulse width modulation method, in particular a centered pulse width modulation method.

In accordance with a further embodiment of the control device in accordance with the disclosure, the angle determining device is designed so as to generate at least one first measuring voltage pulse at a first measuring time point and at least one second measuring voltage pulse that is rotated by more than 90° with respect to the first measuring voltage pulse at a second measuring time point that lies after the first measuring voltage pulse. A magnetic anisotropy is produced in the induction machine in a purposeful manner by means of the measuring voltage pulses and said anisotropy can be detected by means of evaluating the electrical response of the induction machine. For this purpose it is advantageously not necessary to implement any adjustments to the induction machine. The procedure can be used both in the case of permanently magnetic induction machines as well as in the case of separately excited rotating or linear induction machines.

In accordance with a further embodiment of the control device in accordance with the disclosure, the measuring device can furthermore be designed so as to measure stator voltages of the induction machine. The angle determining device can furthermore be designed so as to determine model currents in dependence upon the measured machine currents and the stator voltages of the induction machine on the basis of a model of the induction machine and to form in each case first and second difference current space indicators from the difference of the measured machine currents and the model currents at the first and the second measuring time points.

In accordance with a further embodiment of the control device in accordance with the disclosure, the angle determining device can be furthermore designed so as to determine the rotor angle of the induction machine by means of forming linear combinations of the first and second difference current space indicators.

In this case, the sector in which the rotor is situated can be determined exactly from the sum of the difference current space indicators, and the exact position of the armature within the sector can be determined from the difference of the difference current space indicators. The rotor position is therefore clearly established with a high degree of accuracy. It is not important which phase of the machine is influenced by the measuring voltage pulses so long as the first and the second measuring voltage pulses are rotated by more than 90° with respect to one another.

In accordance with one embodiment of the drive system in accordance with the disclosure, the drive system can furthermore comprise an LC filter device that is arranged between the inverter and the input connectors of the induction machine. This also expands the use of the process of determining the rotor angle to systems having LC filters for which other conventional methods of determining the rotor angle cannot be used.

Further features and advantages of embodiments of the disclosure are evident in the description hereinunder with reference to the attached drawings.

DETAILED DESCRIPTION

Figure 1:
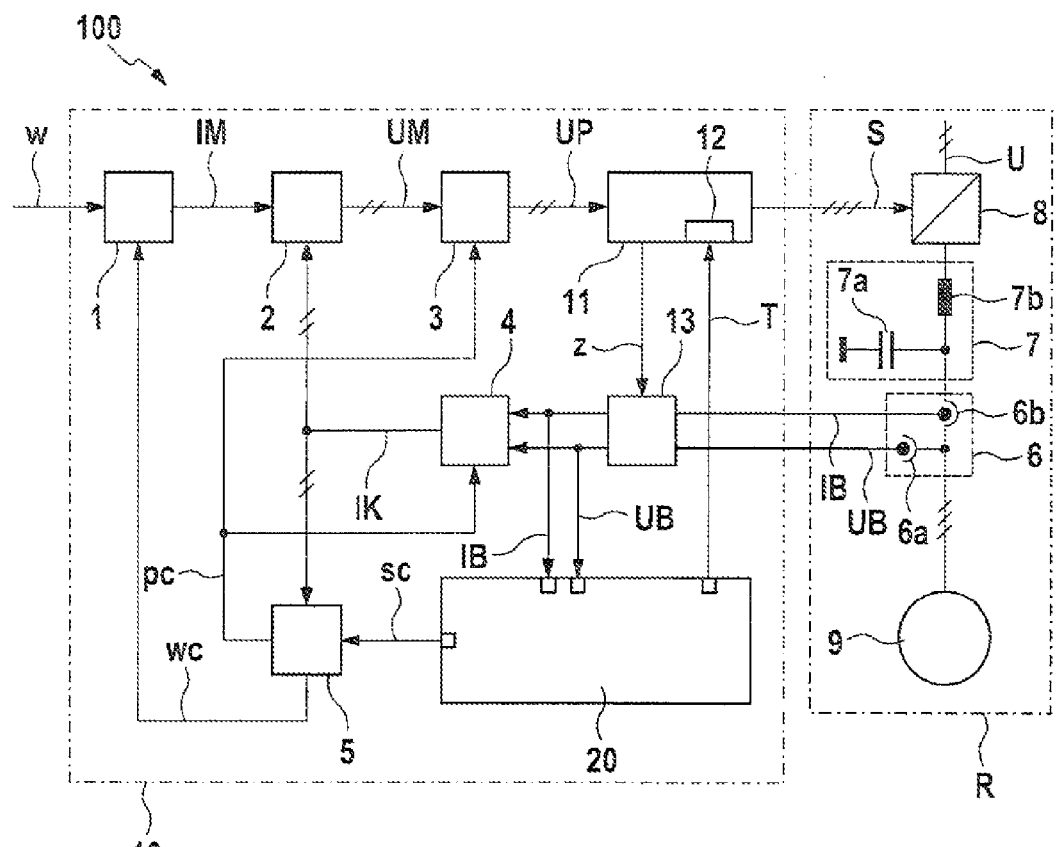
FIG. 1 illustrates a schematic illustration of an electrical drive system having an induction machine in accordance with one embodiment of the present disclosure.

Like or like-functioning components are designated in general by like reference numerals. The schematic signals and parameter progressions that are illustrated in the figures are only of an exemplary nature and are depicted in an idealized manner for the purpose of clarity. It is clear that in practice changing signal and parameter progressions can occur due to the changing boundary conditions and that the illustrated signal and parameter progressions are merely used for the purpose of describing principles and functional aspects of the present disclosure.

Induction machines in the sense of the present disclosure are electrical machines, in which either a constantly magnetized armature or rotor is driven in a synchronized manner by a time-dependent magnetic rotating field in the surrounding field magnet or stator by means of a magnetic interaction so that the rotor performs a movement that is synchronized to the voltage ratios in the stator or lags behind with a corresponding slip angle, in other words that the rotational speed by way of the pole pair number is directly dependent upon the frequency of the stator voltage. Induction machines in the sense of the present invention can be by way of example alternating current induction machines that for example are embodied as outer or inner pole machines that have a rotor and a stator. Furthermore, induction machines in the sense of the present invention can comprise salient pole machines or full pole machines. Full pole machines in the unsaturated state have a rotor inductivity that is not dependent upon the axis while salient pole machines comprise a distinct pole axis, also known as a d-axis in the direction of which, due to the smaller air gap, the main inductivity is greater than in the direction of the pole gap, also known as a q-axis. The following mentioned method and control devices can be used in principle in equal measure for full pole machines and salient pole machines, unless explicit reference is made hereinunder to different treatment of induction machine types. Furthermore, all considerations and explanations provided hereinunder apply for permanently excited and also separately excited rotating as well as linear induction machines.

FIG. 1 illustrates a schematic illustration of an electrical drive system 100 having an induction machine 9 into which a three phase alternating current voltage can be supplied. A direct current voltage U is converted into a three phase alternating current voltage by way of an inverter 8, by way of example in the form of a pulse inverter 8.

The induction machine 9 is by way of example a three phase induction machine. However, it is in principle also possible to provide a different number of phases for the induction machine 9. The control of the induction machine 9 in the electrical drive system plays a central role. In order to provide a required torque using an induction machine, a rotating electrical field is generated in the stator of the machine and said rotating electrical field rotates with the rotor in a synchronized manner. The prevailing angle of the rotor is required for the purpose of generating this field in order to control the induction machine.

The electrical drive system 100 therefore comprises a control device 10 that is coupled to the induction machine 9 or rather the inverter 8 and said control device is designed so as to control the induction machine 9 or rather to regulate its operation. The control device 10 refers back to the time dependent rotor angle of the rotor of the induction machine 9 in relation to the stator of the induction machine 9 for this control or regulating process.

The control device 10 can receive a desired rotational speed w by way of a rotational speed regulator 1 and said rotational speed is converted into corresponding desired currents IM for a stator current regulator 2. The stator current regulator 2 produces corresponding desired voltages UM for the purpose of controlling the induction machine 9. The desired currents IM and desired voltages UM are generated in the d, q-coordinate system and passed to a first transformation device 3 that generates desired voltages UP in the phase coordinate system of the induction machine 9 from the desired voltages UM in the d, q-coordinate system, by way of example three different phase desired voltages UP are generated for a three phase induction machine 9.

The desired voltages UP are converted in a modulation device 11 into control voltage pulses S for the inverter 8 that converts a direct current voltage U into a multiphase alternating current voltage in accordance with the control voltage pulses S. The phase currents that occur as a result of the alternating current voltage can be filtered by way of example in an LC filter device 7 having filter inductors 7b and filter capacitors 7a. The exemplary LC filter device 7 in FIG. 1 represents a deep pass filter for the phase currents.

A subordinate control system is used in order to supply a control deviation to the rotational speed regulator 1 and the first transformation device 3, said subordinate control system comprises a rotational speed calculating device 5. The rotational speed calculating device 5 outputs a calculated actual rotational speed we and also a calculated actual rotor angle pc that are in each case output to the rotational speed regulator 1 and to the first transformation device 3. For this purpose, the rotational speed calculating device 5 uses on the one hand measured phase currents IK in the d, q-coordinate system, said measured phase currents being dependent upon a second transformation device 4 from measured phase currents IB in the phase coordinate system of the induction machine 9. For this purpose, the second transformation device 4 uses the rotor position information by way of the calculated rotor angle pc. On the other hand, the rotational speed calculating device 5 uses a modeled rotor angle sc that is calculated by means of an angle determining device 20.

For this purpose, the angle determining device 20 accepts the measured phase currents IB in the phase coordinate system of the induction machine 9 and also the measured phase voltages UB that by way of example are determined by means of a measuring device 13 with the aid of current and voltage sensors 6a or 6b respectively of a sensor device 6 that is arranged between the LC filter device 7 and the induction machine 9. It can also be possible that the measuring device 13 recalculates the phase voltages UB from the measured phase currents IB.

Figure 2:
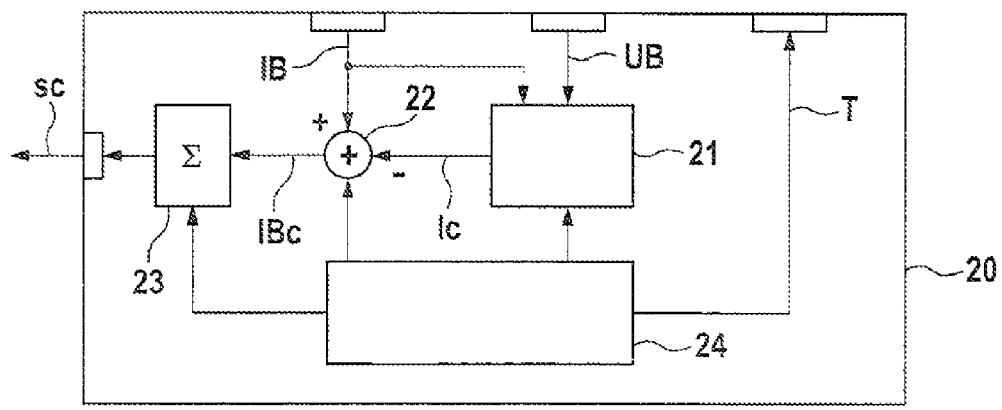
FIG. 2 illustrates a schematic illustration of an angle determining device in accordance with a further embodiment of the present disclosure.

The angle determining device 20 is described in greater detail in an exemplary construction form in FIG. 2. By way of example, the angle determining device 20 can be designed so as to determine several difference current space indicators IBc, wherein an idealized stator current IB of an idealized machine model 21 is calculated from the measured stator voltage. An idealized model machine is understood to mean in this case a completely symmetrical machine without tolerances.

The angle determining device 20 comprises a calculating device 24 that generates measuring voltage pulses at different measuring time points. By way of example, the calculating device 24 can generate a first measuring voltage pulse at a first measuring time point and at least one second measuring voltage pulse that is rotated by more than 90° with respect to the first measuring voltage pulse at a second measuring time point that lies after the first measuring voltage pulse. These measuring voltage pulses can be passed on by way of the control signal T to the modulation device 11 or the selection device 12. For each of the measuring voltage pulses, the corresponding system responses can be determined in the form of measured machine currents IB and the stator voltages of the induction machine 9, by way of example with the aid of a measuring device 13 of the control device 10.

The measuring device 13 can be coupled to input connectors of the induction machine 9 by way of a sensor device 6 so that to measure the measuring device 13 with the aid of a current sensor 6b and/or a voltage sensor 6a the machine currents IB that are generated as a result of the first and second measuring voltage pulses and/or stator voltages UB at the input connectors of the induction machine 9 and as a measuring parameter to the angle determining device 20 on the one hand and the second transformation device 4 on the other hand.

The angle determining device 20 receives the measured machine currents IB and/or stator voltages UB for the purpose of determining the rotor angle of the induction machine 9. For this purpose, the calculating device 24 can to determine the model currents Ic in dependence upon the basis of the model that has been stored in the idealized machine model 21 of the induction machine 9 and at the first and the second measuring time points in each case form first and second difference current space indicators IBc from the difference of the measured machine currents IB and the model currents Ic. In a combiner 23, the different difference current space indicators IBc can then be combined to form linear combinations from which the rotor angle sc of the induction machine 9 can be determined.

By way of example, the first measuring voltage pulse can be supplied to the induction machine 9 at a first measuring time point so that at a point in time after supplying the first measuring voltage pulse a first measurement value for the stator currents IB can be determined in at least two of the phases of the induction machine 9. Similarly, the second measuring voltage pulse that is rotated by more than 90° with respect to the first measuring voltage pulse can be supplied to the induction machine 9 at a second measuring time point so that at a point in time after supplying the second measuring voltage pulse, a second measuring value can be determined for the stator currents IB in at least two of the phases of the induction machine 9.

First and second difference current space indicators IBc are then calculated by means of forming the difference between the measured stator currents IB and the idealized stator currents Ic in a summing device 22. The combiner 23 then forms linear combinations from the determined difference current space indicators from which the rotor position can then be calculated. The sector in which the rotor is situated can then be determined from the total of the difference current space indicators IBc and the exact position of the rotor within the sector can then be determined from the difference of the difference current space indicators IBc. In this method, for each of the measuring processes in each case only one measuring voltage pulse is connected in a user defined phase of the induction machine 9, independently of whether or not an LC filter device 7 is connected upstream of the induction machine 9. The combiner then produces the modulated rotor angle sc as an output parameter and said rotor angle is used by means of the rotational speed calculating device 5 for the purpose of determining the rotor position pc as well as the rotational speed we of the induction machine 9, in particular in the case of low rotational speeds of the induction machine 9.

A magnetic anisotropy is produced in a purposeful manner in the induction machine 9 by means of the measuring voltage pulses and said magnetic anisotropy is detected by way of the stator currents IB and used for the purpose of determining the rotor position. For this purpose it is only necessary to evaluate the electrical response of the induction machine 9. The calculation of the idealized stator current Ic can preferably be calculated from the measured stator voltages UB by means of integration while disregarding the stator resistance. The integration occurs over the time interval from the measuring time point to the point in time at which the stator voltage UB is measured.

A fundamental idea of the disclosure relates to the process of synchronizing the measuring voltage pulses T with the sequence of the control voltage pulses S that are generated during normal operation of the modulation device 11 for the inverter 8. If the measuring voltage pulses T are output to the inverter 8 by means of the modulation device 11 integrated in the normal operation it is no longer necessary or at least it is only now necessary in specific cases to interrupt the control method for the inverter 8 for a rotor angle measuring method.

Figure 3:
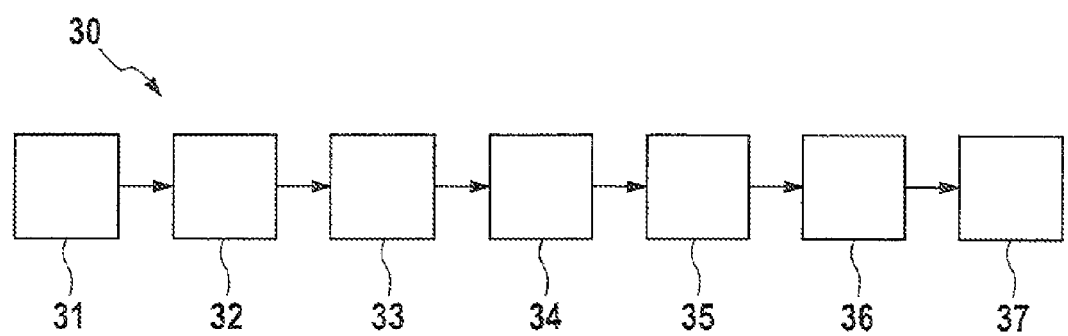
FIG. 3 illustrates a schematic illustration of a method for controlling an induction machine in accordance with a further embodiment of the present disclosure.

FIG. 3 illustrates a schematic illustration of an exemplary method 30 for controlling an induction machine, in particular an induction machine 9 such as that is illustrated in FIG. 1 in an exemplary manner. The method 30 can refer back to the combinations that are explained in relation to FIGS. 1 and 2 as well as 4 to 6.

A process of generating 31 measuring voltage pulses T for the induction machine 9 is performed in a first step by means of the angle determining device 20. Simultaneously, in step 32, voltage switching patterns having control voltage pulses S can be generated by means of the modulation device 11 for the purpose of controlling an inverter 8 that converts a direct current voltage U into an alternating current voltage in dependence upon the control voltage pulses S for the purpose of controlling the induction machine 9.

In step 33 of the modulation device 11, the generated measuring voltage pulses T are passed on by means of the angle determining device 20 so that the modulation device 11 can synchronize the output of the measuring voltage pulses T to the inverter 8 with the output of the control voltage pulses S in step 34. Then in step 35, the measuring voltage pulses T are output to the inverter 8 by means of the modulation device 11.

In step 36, the measuring device 13 can then be used for the purpose of measuring the machine currents IB that are generated by means of the measuring voltage pulses T at the input connectors of the induction machine 9, and in step 37 to pass said machine currents to the angle determining device 20 for the purpose of determining the rotor angle of the induction machine 9 by means of the angle determining device 20.

Figure 4:
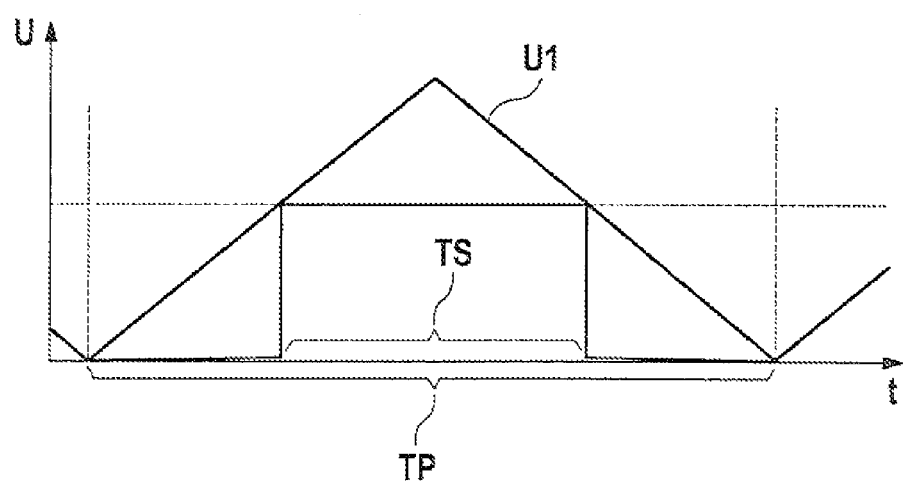
FIG. 4 illustrates a schematic diagram for exemplary pulse width modulation control signals of an induction machine in accordance with a further embodiment of the present disclosure.

FIG. 4 illustrates a schematic diagram for exemplary Pulse-Width Modulation (PWM) control signals of an induction machine, by way of example the induction machine 9 in FIG. 1. In order to generate a phase voltage U1, it is possible during a modulation period TP to generate a control voltage pulse having a pulse duration TS. FIG. 4 illustrates in an exemplary manner a centered PWM control process in which the pulse period TS is embedded centrally in the modulation period TP.

The modulation device 11 comprises a selection device 12 that receives the measuring voltage pulses T of the angle determining device 20 and decides for each of the measuring voltage pulses T whether one of the control voltage pulses of the modulation device 11 is also suitable as a measuring voltage pulse. If this is the case, the selection device 12 can be designed so as to replace the respective measuring voltage pulse that is output by the angle determining device 20 with a respective control voltage pulse of the modulation device 11. As a consequence, control voltage pulses of the modulation device 11 can be used for the purpose of determining the rotor angle without having had to take into account the typical control sequence of the process of controlling the inverter 8.

Figure 5:
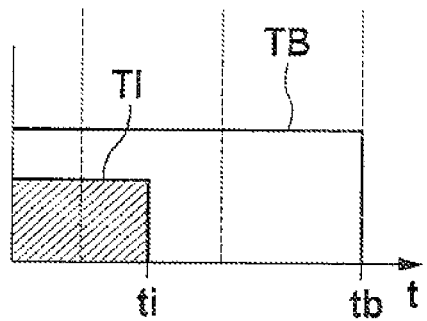
FIG. 5 illustrates a schematic diagram for an exemplary measuring voltage pulse for the purpose of determining a rotor angle of an induction machine in accordance with a further embodiment of the present disclosure.
Figure 6:
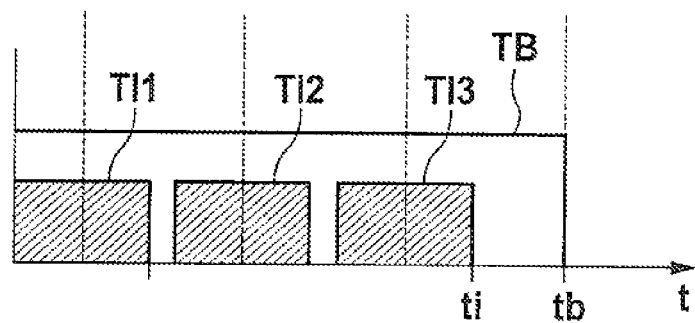
FIG. 6 illustrates a schematic diagram for exemplary measuring voltage pulse sequences for the purpose of determining the rotor angle of an induction machine in accordance with a further embodiment of the disclosure.
Figure 7:
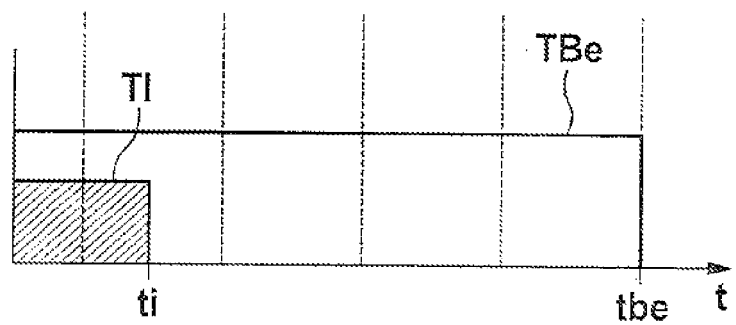
FIG. 7 illustrates a schematic diagram for a further exemplary measuring voltage pulse for the purpose of determining the rotor angle of an induction machine in accordance with a further embodiment of the present disclosure.

For this purpose, schematic diagrams for exemplary measuring voltage pulses or exemplary measuring voltage pulse sequences for the purpose of determining the rotor angle of an induction machine are illustrated in FIGS. 5, 6 and 7. FIG. 5 illustrates the case that an individual measuring voltage pulse TI is used for the purpose of determining the angle of the rotor. After termination of the measuring voltage pulse duration ti of the measuring voltage pulse TI, the measuring interval TB can end at the point in time tb at which the measuring device 13 determines the system response of the induction machine 9 that is produced by means of the measuring voltage pulse TI. The points in time or period durations ti and tb respectively are synchronized with the aid of the modulation period durations of the modulation device 11, said period durations being indicated by the dashed lines.

Particularly where low voltage indicators are to be output, by way of example in the case of low rotational speeds of the induction machine, the ratio of the pulse duration TS of the control voltage pulses can be low with respect to the time period of the modulation period TP in order to produce a suitable system response. FIG. 6 illustrates an exemplary case of this type in which several measuring voltage pulses T1, T2 and T3 follow one after the other within a measuring interval TB. In turn, the points in time or period durations ti and tb respectively are synchronized with the modulation period durations of the modulation device 11 that are indicated by the dashed lines.

Finally, the duration tb of the measuring interval TBe—as is illustrated in an exemplary manner in FIG. 7—can also be adjusted to suit each user-defined measuring time after outputting the measuring voltage pulse TI. The duration tb of the measuring interval TB that is necessary for the method can be adjusted by way of example with the aid of the pulse duty factor of the PWM-control process by means of the modulation device 11. In the present case, the duration tb of the measuring interval TB is extended over several modulation periods.

What is claimed is:

1. A control device for an induction machine comprising:
an angle determining device configured to generate measuring voltage pulses;
a modulation device configured to receive desired voltages for the induction machine and to convert the desired voltages for the induction machine into control voltage pulses usable to control an inverter, and to receive the measuring voltage pulses from the angle determining device, the modulation device being configured to transmit the control voltage pulses and the measuring voltage pulses to the inverter and synchronize transmitting of the measuring voltage pulses to the inverter with transmitting of the control voltage pulses to the inverter, wherein the inverter is configured to convert a direct current voltage into an alternating current voltage based at least in part upon the respective control voltage pulses and the respective measuring voltage pulses, wherein the alternating current voltage is usable to control the induction machine; and
a measuring device configured to be coupled to input connectors of the induction machine, and further configured to:
measure, at the input connectors, machine currents generated by the induction machine in response to the measuring voltage pulses; and
transmit the measured machine currents to the angle determining device, wherein the machine currents are usable by the angle determining device to determine a rotor angle of the induction machine.

2. The control device according to claim 1, wherein the modulation device comprises a selection device configured to:
compare the measuring voltage pulses received by the modulation device with the control voltage pulses generated by the modulation device; and
based at least in part upon comparing the measuring voltage pulses and the control voltage pulses, replace at least one of the measuring voltage pulses with at least one of the control voltage pulses.

3. The control device according to claim 1, wherein the modulation device is further configured to transmit a synchronization signal to the measuring device, wherein the synchronization signal is usable to synchronize the measuring device with the control voltage pulses.

4. The control device according to claim 1, wherein the modulation device is further configured to generate the control voltage pulses usable to control the inverter based at least in part upon a pulse width modulation.

5. The control device according to claim 1, wherein the angle determining device is further configured to:
generate at least one first measuring voltage pulse at a first measuring time point; and
generate at least one second measuring voltage pulse at a second measuring time point,
wherein the at least one second measuring voltage pulse is rotated by more than 90° with respect to the first measuring voltage pulse, wherein the second measuring time point is subsequent to the first measuring time point.

6. The control device according to claim 5:
wherein the measuring device is further configured to measure stator voltages of the induction machine;
wherein the angle determining device is further configured to:

determine model currents based at least upon the machine currents, the stator voltages, and a model of the induction machine;

form a first difference current space indicator at the first measuring time point based at least in part upon a difference between the machine currents and the model currents; and form a second difference current space indicator at the second measuring time point based at least in part upon a difference between the machine currents and the model currents.

7. The control device according to claim 6, wherein the angle determining device is further configured to determine a rotor angle of the induction machine based at least in part upon a linear combination of the first difference current space indicator and the second difference current space indicator.

8. An electrical drive system, comprising:

an induction machine;

an inverter that converts a direct current voltage into an alternating current voltage usable to control the induction machine; and a control device comprising:

an angle determining device configured to generate measuring voltage pulses;

a modulation device configured to receive desired voltages for the induction machine and to convert the desired voltages for the induction machine into control voltage pulses usable to control the inverter, and to receive the measuring voltage pulses from the angle determining device, the modulation device being configured to transmit the control voltage pulses and the measuring voltage pulses to the inverter and synchronize transmitting of the measuring voltage pulses to the inverter with transmitting of the control voltage pulses to the inverter, wherein the inverter is configured to convert the direct current voltage into the alternating current voltage based at least in part upon the respective control voltage pulses and the respective measuring voltage pulses; and a measuring device configured to be coupled to input connectors of the induction machine, and further configured to:

measure, at the input connectors, machine currents generated by the induction machine in response to the measuring voltage pulses; and transmit the measured machine currents to the angle determining device, wherein the machine currents are usable by the angle determining device to determine a rotor angle of the induction machine.

9. The electrical drive system according to claim 8, further comprising:

an LC filter device positioned between the inverter and the input connectors of the induction machine.

10. A method for controlling a synchronous machine, comprising:

generating measuring voltage pulses for the synchronous machine using an angle determining device;

receiving desired voltages for the induction machine and converting the desired voltages for the induction machine into control voltage pulses using a modulation device, wherein the control voltage pulses are usable to control an inverter configured to convert a direct current voltage into an alternating voltage current based at least in part upon the respective control voltage pulses and the respective measuring voltage pulses, wherein the alternating voltage current is usable to control the synchronous machine;

transmitting the control voltage pulses and the measuring voltage pulses to the modulation device;

synchronizing the transmission of the measuring voltage pulses with the transmission of the control voltage pulses;

outputting the synchronized measuring voltage pulses and control voltage pulses from the modulation device to the inverter;

measuring, at input connectors of the synchronization machine, machine currents generated based at least in part upon the measuring voltage pulses;

transmitting the machine currents to the angle determining device, wherein the machine currents are usable by the angle determining device to determine a rotor angle of the synchronous machine.

* * * * *